J. KRODER.
BRACKET FOR STAIR RODS AND THE LIKE.
APPLICATION FILED OCT. 25, 1910.
980,646.
Patented Jan. 3, 1911.
Fig. 1,
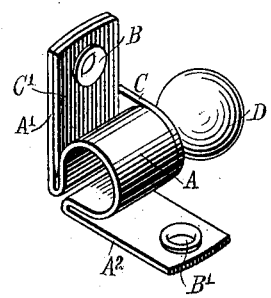
Fig. 2,
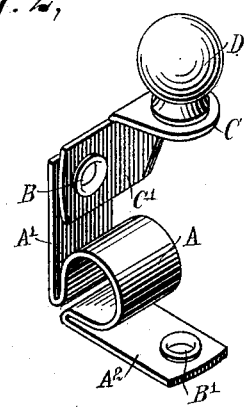
WITNESSES
Edward Thorpe
INVENTOR
John Kroder
BY
ATTORNEYS

UNITED STATES PATENT OFFICE.

JOHN KRODER, OF NEW YORK, N. Y.

BRACKET FOR STAIR-RODS AND THE LIKE.

980,646.

Specification of Letters Patent.  Patented Jan. 3, 1911.

Application filed October 25, 1910.  Serial No. 589,011.

*To all whom it may concern:*

Be it known that I, JOHN KRODER, a citizen of the United States, and a resident of the city of New York, borough of Manhattan, in the county and State of New York, have invented new and Improved Brackets for Stair-Rods and the Like, of which the following is a full, clear, and exact description.

The invention relates to supports for stair rods, curtain rods and the like, and its object is to provide a new and improved bracket for stair rods and the like, arranged to permit convenient opening of the bracket for the insertion or removal of the rod, or closing and locking of the bracket to prevent accidental detachment of the rod or losing any of the parts during the manipulation referred to.

For the purpose mentioned use is made of a short tubular socket having integral attaching flanges for fastening the bracket to a support, and a closing plate mounted to swing on one of the flanges and adapted to close the outer end of the socket.

A practical embodiment of the invention is represented in the accompanying drawings forming a part of this specification, in which similar characters of reference indicate corresponding parts in all the views.

Figure 1 is a perspective view of the bracket in closed position and arranged for use on stairs to hold a stair rod in place; Fig. 2 is a like view of the same in open position.

The short tubular socket A of the bracket terminates in attaching flanges A', A², standing at a right angle one to the other, and provided with eyelets B, B' for the passage of nails, screws or other fastening devices to secure the bracket in position on the stairs at the riser and tread, against which fit the flanges A', A². The outer end of the socket A is adapted to be closed or opened by a closing plate C provided with a knob D and terminating at its rear end in an angular flange C' overlying the attaching flange A' and engaged by the eyelet B, which latter forms a pivot for the flange C' to swing on in an up and down direction, so that the closing plate C is moved either into a closing position by abutting against the outer end of the socket A, as shown in Fig. 1, or the closing plate C is swung into an upper open position, as shown in Fig. 2, for the convenient insertion or removal of the stair rod.

The free end of the angular flange C' of the closing plate C is adapted to pass between the socket A and the attaching flange A' in such a manner that the said parts clampingly engage the free end of the flange C' to hold the closing plate C locked in closed position. In order to insure a proper entrance of the free end of the angular flange C' between the socket A and the attaching flange A', the said free end is preferably slightly beveled, as plainly indicated in Figs. 1 and 2, but it is understood that when the closing plate C is swung into closed position the free end of the angular flange C' is pressed between the socket A and the flange A' and which are sufficiently resilient to accommodate the flange C' and to hold the same clampingly in place against accidental opening or upward swinging of the closing plate C.

The bracket shown and described is very simple and durable in construction, can be cheaply manufactured and readily attached to the stairs, or the like, and the socket can be readily opened for the convenient insertion or removal of the rod, or closed and locked to prevent accidental displacement of the rod or losing any of the parts.

Having thus described my invention, I claim as new and desire to secure by Letters Patent:

1. A bracket, comprising a short tubular socket having integral attaching flanges for attaching the bracket to a support, and a closing plate mounted to swing on one of the flanges and adapted to abut against the outer end of the socket to close the same.

2. A bracket, comprising a short tubular socket having integral attaching flanges for attaching the bracket to a support, and a closing plate mounted to swing up and down in a vertical plane parallel to the axis of the said socket and adapted to abut against the outer end of said socket to close the same.

3. A bracket, comprising a short tubular socket having integral attaching flanges for attaching the brackets to a support, and a closing plate having an angular flange pivoted on one of the said attaching flanges to swing up and down in a vertical plane parallel to the axis of the socket to close the outer end of the socket.

4. A bracket, comprising a short tubular socket having integral attaching flanges for attaching the bracket to a support, a closing plate having an angular flange pivoted on one of the said attaching flanges to swing up and down in a vertical plane parallel to the axis of the socket to close the outer end of the socket, and a locking means for locking the closing plate against accidental opening.

5. A bracket, comprising a short tubular socket having integral attaching flanges for attaching the bracket to a support, a closing plate for closing and opening the outer end of the said socket, the said closing plate having a knob and an angular flange overlying one of the attaching flanges, and a pivot connecting the said angular flange and its attaching flange with each other.

6. A bracket, comprising a short tubular socket having integral attaching flanges for attaching the bracket to a support, a closing plate for closing and opening the outer end of the said socket, the said closing plate having a knob and an angular flange overlying one of the attaching flanges, and a pivot connecting the said angular flange and its attaching flange with each other, the said pivot being in the form of an eyelet for the passage of a fastening means to secure the attaching flange to the support.

7. A bracket, comprising a short socket having integral attaching flanges standing at a right angle one to the other, a closing plate for closing the outer end of the socket and having a knob and an angular pivot flange overlying one of the attaching flanges, and a pivot connecting the said pivot flange with the corresponding attaching flange.

8. A bracket, comprising a short socket having integral attaching flanges standing at a right angle one to the other, a closing plate for closing the outer end of the socket and having a knob and an angular pivot flange overlying one of the attaching flanges, and a pivot connecting the said pivot flange with the corresponding attaching flange and being pivoted thereon, the free end of the said angular pivot flange being adapted to pass between the socket and the corresponding attaching flange to clampingly hold the closing plate in closed position.

In testimony whereof I have signed my name to this specification in the presence of two subscribing witnesses.

JOHN KRODER.

Witnesses:
 THEO. G. HOSTER,
 PHILIP D. ROLLHAUS.